(12) United States Patent
Bartley et al.

(10) Patent No.: US 10,178,364 B1
(45) Date of Patent: *Jan. 8, 2019

(54) DIGITAL IMAGE DYNAMIC RANGE PROCESSING APPARATUS AND METHOD

(71) Applicant: LENTIX, INC., Powell, TN (US)

(72) Inventors: Cheryl Bartley, Powell, TN (US); Paul Bagwell, Seymour, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/709,301

(22) Filed: Sep. 19, 2017

Related U.S. Application Data

(63) Continuation of application No. 15/066,078, filed on Mar. 10, 2016, now Pat. No. 9,769,446.

(60) Provisional application No. 62/306,001, filed on Mar. 9, 2016, provisional application No. 62/130,706, filed on Mar. 10, 2015.

(51) Int. Cl.
*G06T 3/40* (2006.01)
*G06T 5/00* (2006.01)
*G06T 5/20* (2006.01)
*H04N 9/64* (2006.01)
*H04N 9/78* (2006.01)

(52) U.S. Cl.
CPC .......... *H04N 9/646* (2013.01); *G06T 3/4007* (2013.01); *G06T 5/009* (2013.01); *G06T 5/20* (2013.01); *H04N 9/78* (2013.01)

(58) Field of Classification Search
CPC ...... H04N 5/2355; H04N 9/68; H04N 19/186; H04N 5/355
USPC ....... 382/162, 163, 164, 165, 167, 274, 275, 382/282; 358/516, 520, 537, 452, 453, 358/463
See application file for complete search history.

(56) References Cited

U.S. PATENT DOCUMENTS

| | | | | |
|---|---|---|---|---|
| 6,728,428 B1* | 4/2004 | Kinjo | ................. | H04N 1/00132 348/231.6 |
| 6,987,544 B2* | 1/2006 | Ogata | ..................... | G06T 5/007 348/678 |
| 7,479,991 B2* | 1/2009 | Wada | ..................... | H04N 9/735 348/223.1 |
| 7,561,189 B2* | 7/2009 | Chien | ................... | G06T 3/4015 348/222.1 |
| 7,889,272 B2* | 2/2011 | Nishide | .................. | H04N 5/208 348/241 |
| 8,086,030 B2* | 12/2011 | Gordon | ................ | H04N 1/6058 382/162 |
| 8,259,208 B2* | 9/2012 | Ciurea | .................. | G06F 3/0488 345/173 |
| 8,417,046 B1* | 4/2013 | McDougal | ............... | G06K 9/36 382/254 |

(Continued)

*Primary Examiner* — Yosef Kassa
(74) *Attorney, Agent, or Firm* — Wayne Edward Ramage; Baker Donelson

(57) ABSTRACT

An apparatus and related methods for enhancing low dynamic range and high dynamic range digital images. The process converts single digital images into a form that can be shown on traditional electronic and computer displays and paper prints through luminance mapping and tone mapping functions. These functions require the calculation of values for each pixel within the digital image. The values calculated include, but are not limited to, color, grey-level, and luminance. The present apparatus and method builds upon the tone mapping process by combining log-average luminance values of various sized neighborhood tiles with the global log-average luminance of the entire image.

15 Claims, 2 Drawing Sheets

(56) References Cited

U.S. PATENT DOCUMENTS 8,577,169 B2 * 11/2013 Andrus .................. H04N 5/213
                                                          382/274

* cited by examiner

DIGITAL IMAGE DYNAMIC RANGE PROCESSING APPARATUS AND METHOD

This application is a continuation of U.S. patent application Ser. No. 15/066,078, filed Mar. 10, 2016, which claims benefit of and priority to U.S. Provisional Application No. 62/130,706, filed Mar. 10, 2015, and U.S. Provisional Application No. 62/306,001, filed Mar. 9, 2016, and is entitled to those filing dates for priority. The specifications, figures, appendices and complete disclosures of U.S. patent application Ser. No. 15/066,078 and U.S. Provisional Application Nos. 62/130,706 and 62/306,001 are incorporated herein in their entireties by specific reference for all purposes.

FIELD OF INVENTION

This invention relates to an apparatus and related methods for digital image analysis and enhancement for brightness, luminance, and contrast. More particularly, this invention relates to an apparatus and related methods allowing for tone mapping and other image enhancements to a single high dynamic or low dynamic range digital image.

BACKGROUND OF THE INVENTION

Digital images often have a greater range of luminance between light and dark areas of the scene than can be captured and viewed on traditional electronic and computer displays and paper prints. In the current art, digital image enhancement techniques require capturing multiple low dynamic range ("LDR") images at different exposure levels (i.e., "brackets") and merging elements of each exposure to create a single high dynamic range ("HDR") image. LDR images do not exceed a luminance ratio of 225:1, which is common for most commercial cameras and image formats (e.g., jpg, tiff, RAW, and the like). HDR imaging is a term generally used to describe the following: a given image with luminance ratios above 225:1, the technique of merging multiple exposures, and the resulting single digital image.

Practical considerations in this process limit HDR techniques to only those sensors capable of rapidly capturing multiple images at varying exposure levels. In addition, full motion video cannot be processed efficiently because multiple exposures are not captured when the video is recorded.

Accordingly, what is needed is an improved process for converting single LDR or HDR images into a form that can be shown on traditional electronic and computer displays and paper prints.

SUMMARY OF THE INVENTION

In various exemplary embodiments, the present system comprises an apparatus and related methods for enhancing LDR and HDR digital images. The process of converting single digital images into a form that can be shown on traditional electronic and computer displays and paper prints involves luminance mapping and tone mapping functions. These functions require the calculation of values for each pixel within the digital image. The values calculated include, but are not limited to, color, grey-level, and luminance. The present invention then builds upon the tone mapping and spatial convolution processes by combining the log-average luminance values of various sized neighborhood tiles with the global log luminance of the entire image.

Initial luminance mapping calculations reveal the total range and average luminance values within an image. Images often have certain areas within a scene that are dramatically brighter or darker than the rest of the scene, which skews global averages. To account for this problem, the present invention calculates "local neighborhood" values and applies these values in the scaling of each pixel to process different areas according to their specific values and needs.

In several embodiments, to achieve maximum image enhancement, local pixel neighborhoods are measured for their log-average luminance values. A significant benefit of this invention is that during the next step, the scaling process, a new average luminance value is determined. This new average luminance value is a result of blending global log-average luminance and log-average luminance values of various sized neighborhood tiles. This new average luminance, subjected to a key value, is used to scale each individual pixel. The result is a method where pixel luminance values are scaled by calculations with increased visual acuity. As a result, areas of high luminance and low luminance in a scene are processed automatically to provide an enhanced image in real time or near real time.

In a further embodiment, the present invention enhances images quickly enough that it can be used to process full HD video at 30 fps or more. The present invention processes each frame of the video as a still image, and displays each enhanced image sequentially to produce of full motion video. The present invention thus processes full motion HD video in real time or near real time. The present invention can process various video formats, including, but not limited to, .mp4, .avi, .wmv, and h.264 streaming.

DETAILED DESCRIPTION OF EXEMPLARY EMBODIMENTS

In various exemplary embodiments, the present system comprises an apparatus and related methods for enhancing LDR and HDR digital images. The process of converting single digital images into a form that can be shown on traditional electronic and computer displays and paper prints involves luminance mapping and tone mapping functions. These functions require the calculation of values for each pixel within the digital image. The values calculated include, but are not limited to, color, grey-level, and luminance. The present invention then builds upon the tone mapping processes by combining log-average luminance values or various sized neighborhood tiles with the global log-average luminance.

Initial luminance mapping calculations reveal the total range and average luminance values within an image. Images often have certain areas within a scene that are dramatically brighter or darker than the rest of the scene, which skews global averages. To account for this problem, the present invention calculates the log-average luminance to process different areas according to their specific values and needs.

In several embodiments, to achieve maximum image enhancement, local pixel neighborhoods are measured for their luminance values. A significant benefit of this invention is that during the scaling process a new average luminance value is determined. This new average luminance value is a result of blending the log-average luminance values of various sized neighborhood tiles with the global log-average luminance. This new average luminance, subjected to a key value, is used to scale each individual pixel. The result is a method where pixel luminance values are scaled by calculations with increased visual acuity. As a result, areas of high luminance and low luminance in a scene are processed automatically to provide an enhanced image in real time or near real time.

The present invention comprises an improvement of the technique described in Reinhard, et al., "Photographic Tone Reproduction for Digital Images," a copy of which is attached hereto as an appendix, and which is incorporated herein by specific reference for all purposes. The Reinhard formulas are designed for the third step of the following HDR multi-exposure processing methodology: (1) capture multiple LDR images at different exposure levels; (2) layer or merge the LDR images into one compressed HDR image; and (3) apply processes (described in Reinhard) to the compressed HDR image. In contrast, the present invention starts with a regular LDR single image capture, and applies an independent formula for enhancing global and local information at the same time, which is not done by prior art processes for near real time video processing.

Figure 1:
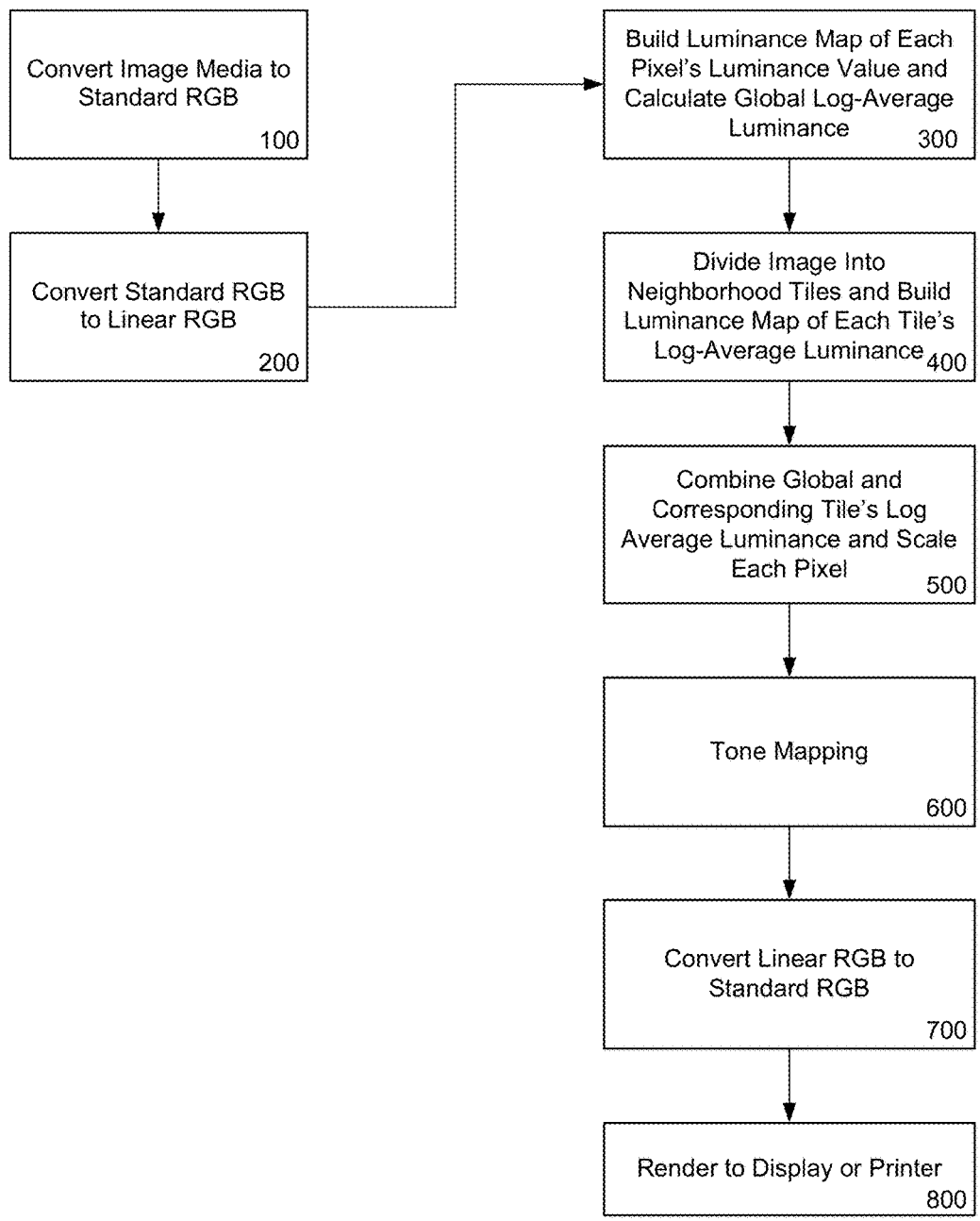
FIG. 1 shows a diagram of a method in accordance with an embodiment of the present invention.

An exemplary embodiment of a process according to the present invention is shown in FIG. 1. First, at step 100, the image acquired by the sensor/camera is converted to standard RGB (Red-Green-Blue) by system libraries. YUY2 media (YUY2 is a chroma subsampled YUV color space, as opposed to RGB color space, and is often used for device image capture and editing) typically would be formatted using standard BT.709 or BT.601 transfer functions that affect gamma values. Modifying the gamma values at this stage, as is done in prior art methods, results in a lower quality image as the end result. The present invention, in contrast, converts the image data to standard RGB values using the following JPEG conversion formula, so that gamma values are not disturbed:

$$R = Y + 1.402 \cdot (C_R - 128)$$

$$G = Y - 0.34414 \cdot (C_B - 128) - 0.71414 \cdot (C_R - 128)$$

$$B = Y + 1.772 \cdot (C_B - 128)$$

Next, at step 200, the standard RGB color values are converted to linear RGB values by applying a relatively simple inverse response function with a non-conventional gamma value of 2.7, as follows:

$$C_{linear} = C_{srgb}^{2.7}$$

This is different from the conventional formula, which uses a conventional gamma value of 2.4, applied by prior art processes:

$$C_{linear} = \begin{cases} \frac{C_{srgb}}{12.92}, & C_{srgb} \leq 0.04045 \\ \left(\frac{C_{srgb} + a}{1 + a}\right)^{2.4}, & C_{srgb} > 0.04045 \end{cases}$$

where a=0.055, and where C is R, G, or B. The calculation used by the present invention is significantly faster than the prior art, thereby allowing for the 30 or greater fps processing speed described below, and further has the advantage of saving the original pixel values for a more advanced tone mapping function later in the process.

Next, at step 300, a luminance map is built by mapping each pixel's luminance value and its corresponding location in the image. The luminance is calculated from the linear RGB pixel values. Then the global log-average luminance is calculated by summing all the luminance values and dividing by the number of pixels. In several embodiments, the global log-average luminance value is calculated according to the following formula:

$$\bar{L}_w = \exp\left(\frac{1}{N} \sum_{x,y} \log(\delta + L_w(x, y))\right)$$

where $L_w(x,y)$ is the world luminance for pixel (x,y), N is the total number of pixels in the image, and is a small value to avoid the singularity that occurs if black pixels are present in the image. The maximum luminance is determined by comparing each pixel luminance value in the image, and keeping the largest value found in the image.

At step 400, the image is divided into various-sized (which may be equally sized) geometric neighborhood tiles. The pixel size of neighborhood tiles is based on the size of the image. In several embodiments, a default neighborhood configuration divides the image into 1,024 tiles in a 32×32 tile arrangement. For example, a 1920×1080 pixel image divided into 32×32 neighborhoods results in 1024 tiles measuring 60×34 pixels each.

The log-average luminance of each neighborhood tile is then computed as described above, in the same manner as the global log-average luminance. The luminance map of the neighborhood tile is then resized to the same size as the original image using linear interpolation. At this point in the process there are two luminance maps. The first maps each pixel's luminance value and its corresponding location in the image. The second maps each tile's average luminance to its corresponding location in the image.

Figure 2:
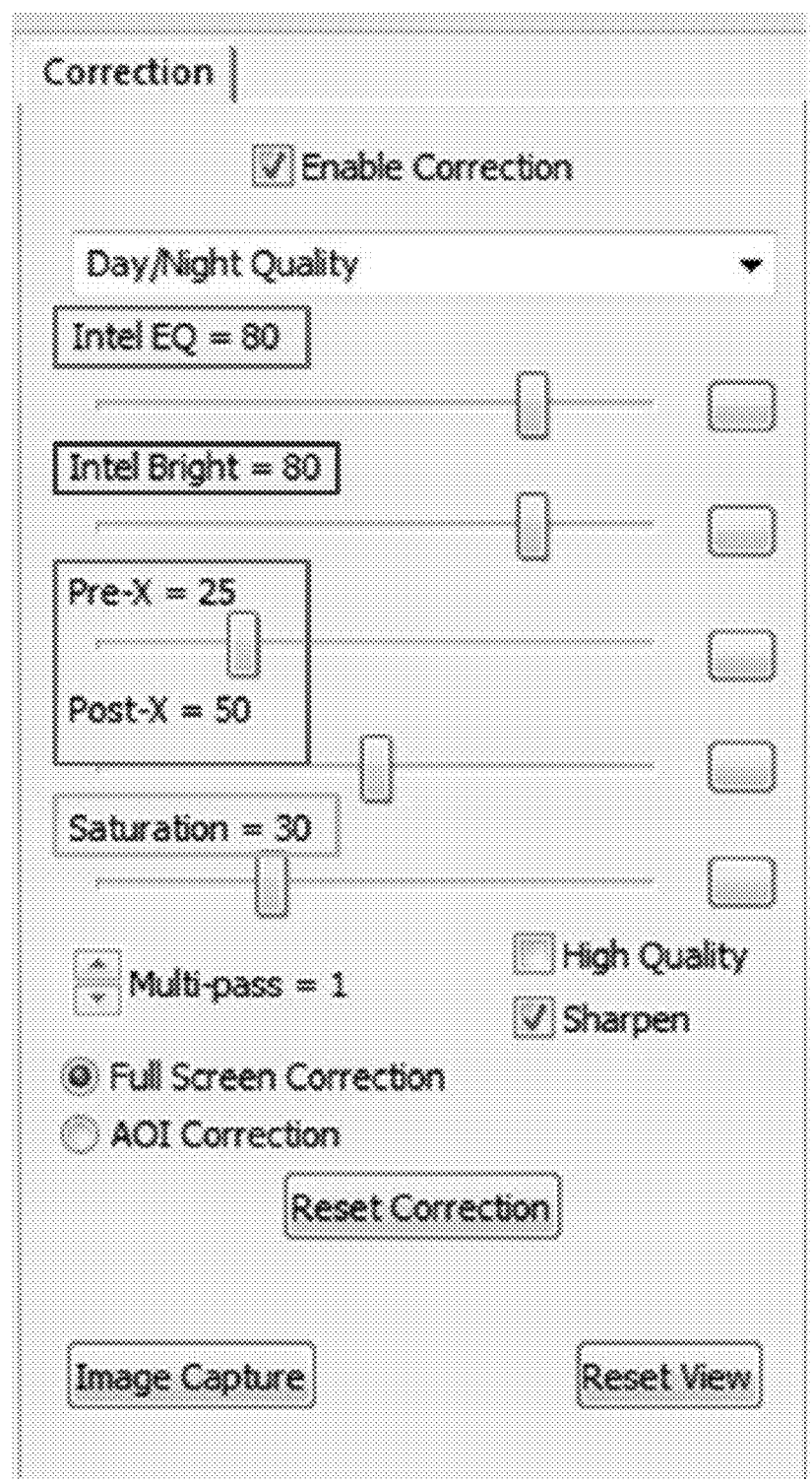
FIG. 2 shows an example of a user interface window.

At step 500, the present invention determines a new combined average luminance, $\bar{L}_s$, by combining the log-average luminance of the corresponding tile, $\bar{L}_T$, with the global log-average luminance, $\bar{L}_w$, as follows:

$$\bar{L}_s = i\bar{L}_T + (1-i)\bar{L}_w$$

where i is the weighting value, ranging from 0 to 1.0. As i increases to 1.0, the pixel's scaling is weighted more by its regional luminance, $\bar{L}_T$. As i approaches 0.0, the pixel's scaling is weighted more by the global luminance. In several embodiments, the user can select the weight value as desired to give more weight globally than locally, or vice versa. In one embodiment, the user selects the weight value using a slider bar (as seen in FIG. 2). The pixel's luminance may then be scaled using the new combined average luminance, $\bar{L}_s$, with the following formula:

$$L(x, y) = \frac{a}{\bar{L}_s} L_w(x, y)$$

where a is the key value ranging from 0 to 1.0. Dividing the image into smaller neighborhood tiles prevents a large, bright area of the image from influencing the scaling of darker areas.

At step 600 tone mapping is performed using the following formula:

$$L_d(x, y) = \frac{L(x, y)\left(1 + \frac{L(x, y)}{L_{white}^2}\right)}{1 + L(x, y)}$$

where $L_{white}$ is the smallest luminance mapped to pure white, allowing high luminance areas to burn out in a controllable fashion.

Next, at step 700, the present invention converts the linear RGB values back to standard RGB by applying an inverse response function with a non-conventional gamma value of 2.7, as opposed to the conventional gamma value of 2.4 as shown in the following formula.

$$C_{srgb} = C_{linear}^{1/2.7}$$

In addition, the conversion used does not apply the color value conditions called for in the conventional formula shown below:

$$C_{srgb} = \begin{cases} 12.92 C_{linear}, & C_{linear} \leq 0.0031308 \\ (1+a) C_{linear}^{1/2.4} - a, & C_{linear} > 0.0031308 \end{cases}$$

where a=0.055.

The tone mapped standard RGB image is then rendered to a display screen 800 or other output device.

In one exemplary embodiment, an apparatus for carrying out the present invention comprises a computing device with a graphic processing unit (GPU). In one embodiment, the computing device comprises a storage disk at least 50 GB in size, RAM storage of at least 8 GB in size, core processing (i.e., a processor or microprocessor) of at least 1.7 Ghz, and a GPU supporting DirectX 11.1 and Shader Model 5.0. Other embodiments include processing without a GPU on smartphones, tablet computing device, and other mobile computing devices.

In a further embodiment, the present invention provides a "high quality" option, including sharpening, through an additional step using Gaussian convolution. This option uses the local "dodging-and-burning" technique, but with pixel scaling performed using combined global average luminance and the neighborhood tile average luminance. A Gaussian center-surround function is constructed using circularly symmetric Gaussian profiles of the following form:

$$R_i(x,y,s) = 1/(\pi(\sigma_i s)^2) \exp(-(x^2+y^2)/[(\sigma_i s)]^2)$$

where the profiles operate at different scales s and at different image positions (x, y). Convolving the image with these Gaussian profiles results in a response $V_i$ as a function of image location, scale, and luminance distribution, L:

$$V_i(x,y,s) = L(x,y) \times R_i(x,y,s)$$

The present invention employs the Gaussian center-surround function to create multiple local regions for symmetric Gaussian profiles (the profiles operating at different scales, s, and at different positions, (x,y)), using the center-surround formula:

$$V(x,y,s) = (V_1(x,y,s) - V_2(x,y,s))/(2\phi a/s^2 + V_1(x,y,s))$$

where center $V_1$ and surround $V_2$ responses are derived from the process described above for step 500. The free parameter a represents the key value as described above, and φ represents the sharpening value or parameter.

This center-surround formula establishes a measure of locality for each pixel, which amounts to finding a scale $S_m$ of appropriate size. The goal is to identify the largest area around a given pixel where no large contrast changes occur. Computing the size of this area uses the center-surround formula at different scales, s. Threshold V to select the corresponding scale $S_m$ to identify the largest area around a pixel with relatively similar luminance values. Starting with the lowest scale, the first scale $S_m$ is sought where the following formula is true (where ε is the threshold).

$$|V(x,y,s_m)| < \varepsilon$$

The global tone reproduction operator described above, $L_d(x,y)$, can be converted into a local operator by replacing L with $V_1$ in the denominator:

$$L_d(x,y) = (L(x,y)(1 + L(x,y)/(L_{white}^2)))/(1 + V_1(x,y,s_{m(x,y)}))$$

As a result, the above formula functions as the local neighborhood contrast enhancement operator. Both high luminance and low luminance pixels will see increased contrast relative to their respective surrounding areas.

While the above invention has been described in the context of HDR images, it also can be used for low dynamic range ("LDR") images. Unlike prior art methods and systems, which focus on HDR correction, the present invention provides enhancement for both HDR and LDR images. As a further advantage, the present invention enhances images quickly enough that it can be used to process full HD video at 30 fps or more, in additional to modifying previously acquired or stored images or video. The present invention processes each frame of the video as a still image, and displays each enhanced image sequentially to produce of full motion video. The present invention thus processes full motion HD video in real time or near real time. The present invention can process various video formats, including, but not limited to, .mp4, .avi, .wmv, and h.264 streaming.

Accordingly, the present invention is useful for a variety of purposes requiring enhanced images and video, including, but not limited to, optical surveillance. the present invention can enhance full motion video or still images in real time, even in the most austere and limited lighting conditions, in both day and night. Thus, the invention allows surveillance camera feeds that would be too dark or difficult to see in their entirety (due to shadows, dark areas, or night-time lighting) to be processed and modified in real time so the displayed image reveals possible threats or targets. The present invention also may be used to show a video or still image in full color. The present invention operates quickly enough so that an incoming data feed from the surveillance camera or other source can be processed and the enhanced modified image rendered on a display in real time, thereby revealing information that would otherwise not be visible in the unmodified image.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for transforming and displaying a digital image, comprising the steps of:
   calculating the luminance of each pixel in a digital image comprising a plurality of pixels;
   calculating the global average luminance for said digital image;
   determining the maximum luminance for all pixels in said plurality of pixels;
   dividing the digital image into neighborhood tiles;
   calculating the log-average luminance value of said neighborhood tiles;
   scaling each pixel based upon the combination of the global average luminance for the digital image and the log-average luminance value of said neighborhood tiles; and
   performing tone mapping on the scaled pixel image.

2. The method of claim 1, wherein the digital image is a low dynamic range image.

3. The method of claim 1, wherein the digital image is a high dynamic range image.

4. The method of claim 1, wherein the digital image is a frame of a digital video stream.

5. The method of claim 1, further comprising the step of rendering the tone mapped image to a display device.

6. The method of claim 5, wherein the steps of the method are performed in real time.

7. The method of claim 5, wherein the display device is a display screen or monitor.

8. The method of claim 5, wherein the display device is a printer.

9. A method for transforming and displaying a digital video image, comprising the steps of:
   sequentially capturing a plurality of digital images from a digital video stream, each digital image comprising a plurality of pixels;
   sequentially processing each digital image from said plurality of digital images by performing the following steps:
   (a) calculating the luminance of each pixel in a digital image comprising a plurality of pixels;
   (b) calculating the global average luminance for said digital image;
   (c) determining the maximum luminance for all pixels in said plurality of pixels;
   (d) dividing the digital image into neighborhood tiles;
   (e) calculating the log-average luminance value of said neighborhood tiles;
   (f) scaling each pixel based upon the combination of the global average luminance for the digital image and the log-average luminance value of said neighborhood tiles; and
   (g) performing tone mapping on the scaled pixel image.

10. The method of claim 9, wherein the digital video stream is a low dynamic range digital video stream.

11. The method of claim 9, wherein the digital video stream is a high dynamic range digital video stream.

12. The method of claim 9, further comprising the step of rendering the tone mapped image to a display device.

13. The method of claim 12, wherein the step of sequentially processing each digital image is performed in real time as each image is processed to produce full motion video.

14. The method of claim 12, wherein the display device is a display screen or monitor.

15. The method of claim 12, wherein the display device is a printer.

* * * * *